May 3, 1949.　　　R. M. WILSON ET AL　　　2,468,907
ELECTRIC FENCE POST
Filed Feb. 13, 1947
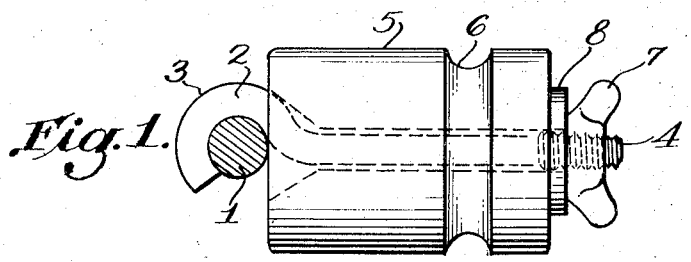
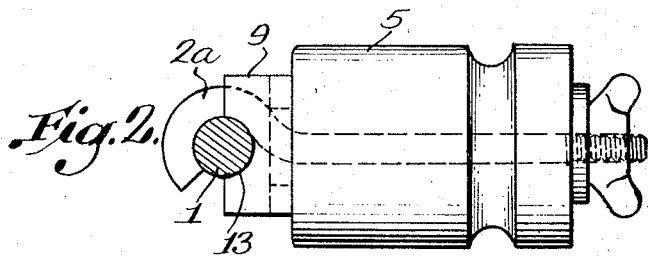
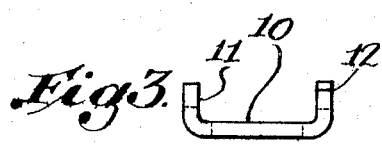
INVENTOR
R. M. Wilson & G. F. Phillipps
BY Roy A. Plant
ATTORNEY Patented May 3, 1949

2,468,907

UNITED STATES PATENT OFFICE 2,468,907

ELECTRIC FENCE POST

Robert M. Wilson and Goddie F. Phillipps,
Battle Creek, Mich.

Application February 13, 1947, Serial No. 728,292

2 Claims. (Cl. 174—45)

The present invention relates broadly to fences, and in its specific phases to posts and insulator mountings for electrified fences.

While the art of building fences to retain domesticated animals, and for protection, is exceedingly old, the discovery that an electrically charged fence can be effectively used in connection with domestic animals ranging in size from small pigs to horses and cattle, is of relatively recent origin. This latter practice is based upon discovery that domestic animals such as pigs, sheep, horses, and cattle can be safely given a mild electric shock, and once having been shocked, the animal seems to remember that he got it from the fence and tends to keep from touching it again, thus making simple fencing possible and avoiding the old problem of fence damage due to the domestic animals trying to eat across the fence line. Once this discovery had been made, units for electrically charging a fence wire were quickly placed on the market, and farmers took advantage of it for penning their cattle and other domestic animals in restricted grazing areas. With this system the necessity of fixed location field fencing became unnecessary and fields could be varied in size at will with the grazing areas enclosed by this simple and readily movable electric fence.

The next immediate problem was how to support the charged wire which had to be carried on insulators to prevent short circuiting. To meet this the charged wire was initially strung on insulators nailed to trees, spuds, pieces of board, sticks, and temporary wood posts. This makeshift procedure was not too satisfactory due to the general unsightliness of the fence, breakage, and difficulty of removing the posts and wire for relocation. The shortage and cost of wooden posts for general fencing had previously led to the use of T-section and L-section steel fence posts which were constructed with upwardly projecting tabs or the like for supporting woven wire fencing as well as barbed wire. With the advent of the electrified fence idea, several different ways were proposed for fastening insulators on these standardized T-shaped and L-shaped posts, and they varied from requiring special projecting lugs or perforations in the posts for anchoring the insulator mounting, to combinations having coil spring locks and requiring special slots in the post flange. Those procedures were still of makeshift type since these steel posts were heavy, relatively expensive, and particularly designed with tongues, perforations, or corrugations for specific use in carrying woven wire fencing in permanent location rather than one or two electric wires separately mounted on insulators. Moreover, the steel posts had to be very carefully set in order to have them face properly since otherwise the insulator might point in the direction of the fence line rather than substantially perpendicular to it, a thing which would cause the electric wire to short on the post as it passed around same to the insulator. Generally speaking the insulator attachments were only adjustable up and down by fixed amounts corresponding to the location of special slots, corrugations, or tongues on the steel post, and none of them were adjustable around the post so that the direction in which it faced would cease to be a problem. It was a recognition that the wooden stake system was far from being wholly satisfactory for supporting electric fence insulators, and that the T-shaped and L-shaped steel posts with the makeshift insulator attachments likewise were not wholly satisfactory, which led to the conception and development of the present invention.

Accordingly among the objects of the present invention is the provision of an electric fence post with at least one insulator mounting, wherein the assembly is simple to manufacture, easy to use, reliable, efficient, and of relatively low cost.

Another object is to provide an electric fence post assembly wherein the insulator mounting is readily removable and yet stable when fastened in place under conditions of use.

Another object is to provide an electric fence post which has no complex or trick parts to get out of order.

A further object is to provide an insulator carrying member which is anchorable to the post by a single tighteninug means which may be in the form of a pinch clamp in one construction, or a threaded member in other constructions.

A further object is to provide an electric fence post assembly wherein the insulator mounting is adjustable longitudinally, as well as circumferentially, of the post in any desired amount.

A further object is to provide an electric fence post assembly wherein the insulator mounting may be adjusted longitudinally of the post without detaching the wire, a thing which is important when the wire elevation is to be changed, for instance, from cattle retaining height to pig retaining height.

A still further object is to provide a sidewise projecting adjustable insulator carrier adapted for mounting on rod type posts, which, for instance, may be round, hexagon, octagon, or the like.

Still further objects and advantages of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of various ways of which the principle of the invention may be used.

In the annexed drawings:

Figure 1 shows a sectional top view of one preferred form of the present invention.

Figure 2 shows a modification of the Figure 1 construction wherein a platform washer is used between the insulator and the rod type post.

Figure 3 shows an elevational edge view of the platform washer forming part of the Figure 2 assembly.

Referring more particularly to Figure 1 of the drawing, a rodlike post 1 is shown with a projecting rod member 2 which has a hook 3 at one end and a threaded portion 4 at the other. Mounted on rod member 2 is an electric insulator 5 which has a conventional circumferential groove 6. This insulator may be made out of glass, porcelain, mica, rubber, plastic, ceramics, or other suitable material. A wing nut 7 engages threaded portion 4 of rod member 2 and when this wing nut is tightened up it forces the insulator 5 against post 1 and fastens them together in relatively fixed position. If desired, a fibre or leather washer 8 may be used between wing nut 7 and insulator 5 to give a little flexibility in tightening and holding the elements of the assembly in fixed relation. This type of construction permits the insulator assembly, upon loosening wing nut 7, to be adjusted in any desirable amount both longitudinally and circumferentially of post 1.

In preferred construction, post 1 is in the form of a ⅜" diameter steel rod which may be sharpened on its lower end and provided with a ground anchor plate (not shown) if desired. While post 1 has been shown as being round in section, same may be made of other shaped rods, such for instance, as hexagon or octagon rod, and for simplicity of describing this equivalent group they will be referred to as a rodlike post. These posts, to improve their appearance, may also be painted, plated, or made from rust resisting material. With this construction it is an easy matter to adjust the insulator to any desired location whether it be low for small pigs or high for horses and cattle, and such adjustment may be even made without removing the electric wire when same is strung on the insulators according to standard practice.

A modification of the Figure 1 apparatus is shown in Figure 2 where the extending rod member 2a is made a little longer than rod 2 and a platform washer 9 is placed between insulator 5 and post 1. This washer, as is shown in edge view in Figure 3, has a center portion 10 which is suitably perforated for rod 2a. Extending from the opposite edges of this center portion 10 are leg members 11 and 12, each of which is provided with a depression 13, Figure 2, adapted to fit up against the side of post 1 at opposite sides of rod member 2a. This platform washer provides a broader base upon which to set insulator 5 and thus decreases the possibility of insulator breakage.

The various constructions described above make possible a light weight, relatively inexpensive, and efficient construction which is easily adjustable either longitudinally or circumferentially of the post. These constructions are also easy to dismantle and remove to storage or a different location. While the mounting of only one insulator on a post has been illustrated in each of the figures it is obvious that more than one such insulator can be used, and in fact two are commonly used in this manner. The lower one to pen in small animals such as pigs and sheep while the higher one is used to take care of larger animals such as horses and cattle. It was felt that it was unnecessary to show more than one insulator since the additional showing would amount to duplication and on that basis it is to be considered that the showing diagrammatically illustrates the use of one or more insulators on each post.

Other modes of applying the principle of our invention may be employed instead of those explained, change being made as regards the article and combinations herein disclosed, provided the means stated by any of the following claims or the equivalent of such states means be employed.

We therefore particularly point out and distinctly claim as our invention:

1. In an electric fence post of the kind described, a fence post of symmetrical cross-section, a J-bolt threaded at the outer end only of its leg and having its bent end of reverse curve formation hooked around said post, a nut on said bolt acting when screwed up to clamp said bolt immovably on said post, and an insulator carried by said bolt and centered on the side of the post.

2. In an electric fence post of the kind described, a fence post of symmetrical cross-section, a J-bolt threaded at the outer end only of its leg and having its bent end of reverse curve formation hooked around said post, a nut on said bolt acting when screwed up to clamp said bolt immovably on said post, and an insulator carried by said bolt and centered on the side of the post, said insulator being interposed between the nut and the post.

ROBERT M. WILSON.
GODDIE F. PHILLIPPS.

REFERENCES CITED

The following references are of record in the file of this patent:

UNITED STATES PATENTS

| Number | Name | Date |
| --- | --- | --- |
| 234,440 | Ticknor et al. | Nov. 16, 1880 |
| 732,088 | Lemstrom | June 30, 1903 |
| 1,012,724 | Sessions | Dec. 26, 1911 |
| 1,125,742 | Sessions | Jan. 19, 1915 |
| 1,271,596 | Mayer | July 9, 1918 |
| 1,292,451 | Fort | Jan. 28, 1919 |
| 2,222,810 | Daily | Nov. 26, 1940 |
| 2,235,102 | Fleener | Mar. 18, 1941 |
| 2,269,996 | Webster | Jan. 13, 1942 |
| 2,409,491 | Johnson | Oct. 15, 1946 |

FOREIGN PATENTS

| Number | Country | Date |
| --- | --- | --- |
| 3,471 | Great Britain | Mar. 9, 1916 |